(12) United States Patent
Annema et al.

(10) Patent No.: US 7,232,365 B2
(45) Date of Patent: Jun. 19, 2007

(54) METHOD AND DEVICE FOR REMOVING A BONE FROM AN EXTREMITY OF A SLAUGHTER ANIMAL

(75) Inventors: Hein Annema, Stevensbeek (NL); Adrianus Josephes van den Nieuwelaar, Gemert (NL); Johannes Antoon Vincent van Kippersluis, Ede (NL)

(73) Assignee: Stork PMT B.V., Boxmeer (NL)

( * ) Notice: Subject to any disclaimer, the term of this patent is extended or adjusted under 35 U.S.C. 154(b) by 0 days.

(21) Appl. No.: 10/495,052

(22) PCT Filed: Nov. 1, 2002

(86) PCT No.: PCT/NL02/00696

§ 371 (c)(1),
(2), (4) Date: May 5, 2004

(87) PCT Pub. No.: WO03/039262

PCT Pub. Date: May 15, 2003

(65) Prior Publication Data

US 2005/0059333 A1    Mar. 17, 2005

(30) Foreign Application Priority Data

Nov. 5, 2001    (NL) .................................... 1019293

(51) Int. Cl.
*A22C 21/00*    (2006.01)
(52) U.S. Cl. .................................................... 452/167
(58) Field of Classification Search ..................... None See application file for complete search history.

(56) References Cited

U.S. PATENT DOCUMENTS

| 4,993,113 | A | * | 2/1991 | Hazenbroek | 452/136 |
| 5,176,562 | A | | 1/1993 | Martin et al. | |
| 5,277,649 | A | | 1/1994 | Adkison | |
| 5,401,210 | A | * | 3/1995 | Manmoto et al. | 452/136 |
| 5,462,477 | A | * | 10/1995 | Ketels | 452/135 |
| 5,961,383 | A | * | 10/1999 | Janssen et al. | 452/135 |
| 5,976,004 | A | * | 11/1999 | Hazenbroek | 452/136 |
| 6,007,417 | A | * | 12/1999 | Jones et al. | 452/138 |
| 6,299,524 | B1 | * | 10/2001 | Janssen et al. | 452/198 |
| 7,004,830 | B2 | * | 2/2006 | van der Steen et al. | 452/185 |

FOREIGN PATENT DOCUMENTS

| EP | 0 763 326 A1 | 3/1997 |
| WO | WO 91/11912 | 8/1991 |
| WO | WO 00/59311 | 12/2000 |

* cited by examiner

*Primary Examiner*—Thomas Price
(74) *Attorney, Agent, or Firm*—Birch, Stewart, Kolasch & Birch, LLP

(57) ABSTRACT

In a method and device, an elongate bone is removed from a meat-comprising extremity or part thereof of a slaughter animal. The bone has a first joint end, which forms part of a first joint, and a second joint end, which forms part of a second joint. The bone is taken out of the extremity at the first joint end, a tissue connection between the extremity and the second joint end of the bone substantially being retained. Then, meat is moved away from the bone in the region of the second joint end of the bone as a result of at least a part of the bone being moved in its longitudinal direction with respect to a scraper device towards and in particular beyond the second joint end, and the tissue connection between the extremity and the bone is mechanically broken.

27 Claims, 18 Drawing Sheets

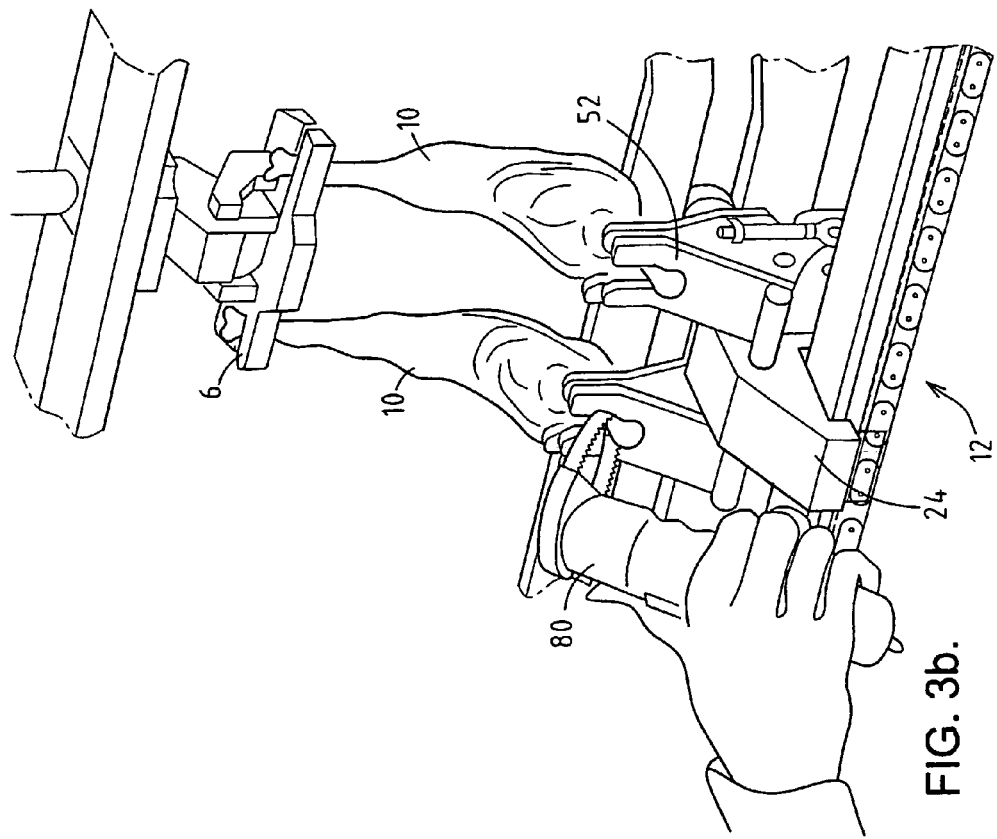
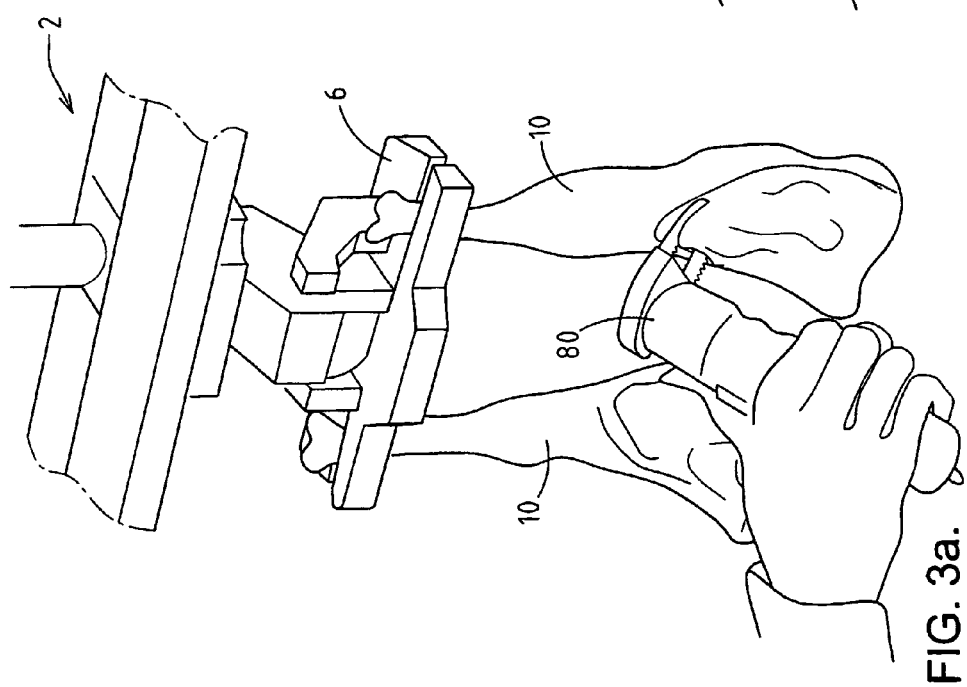

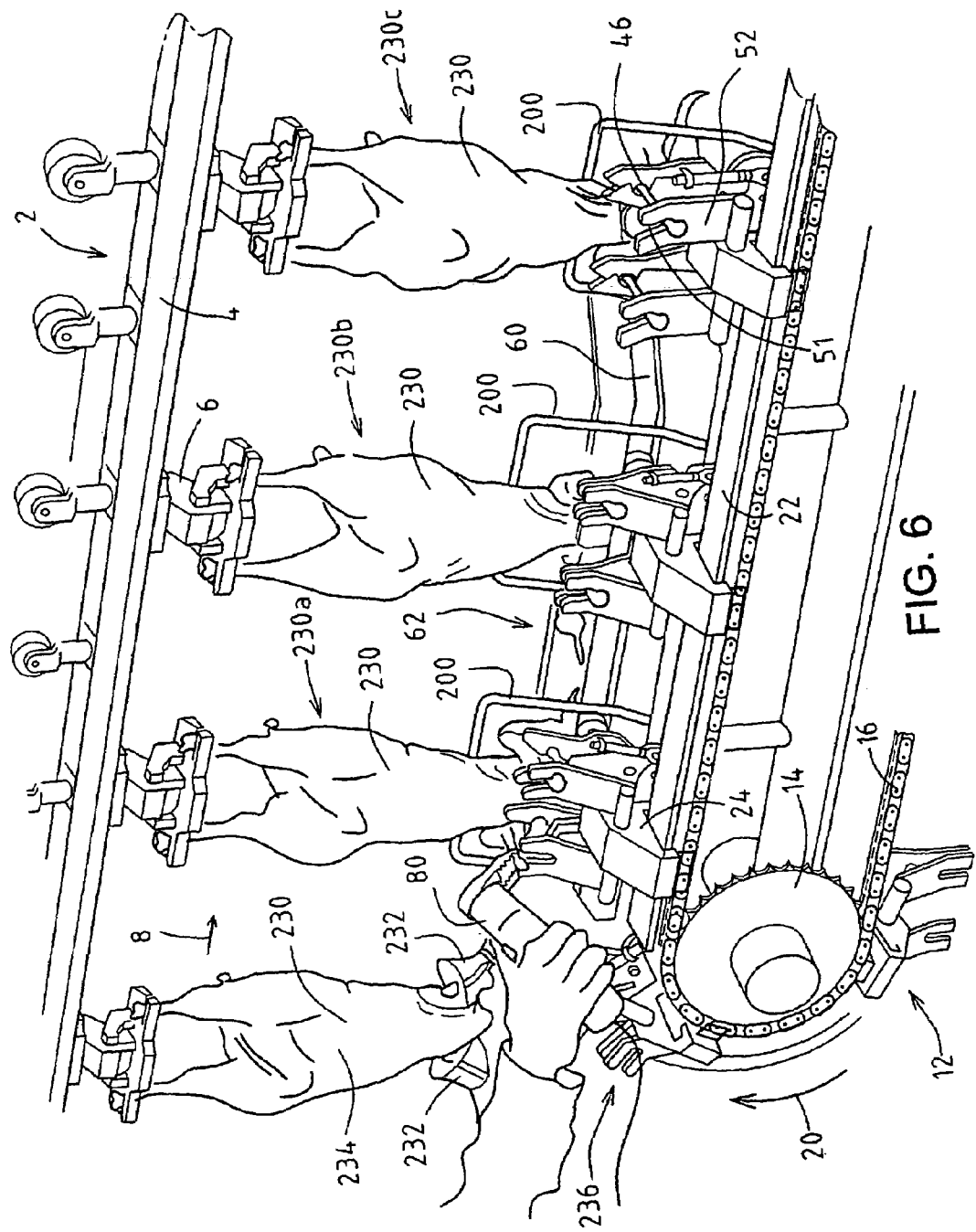

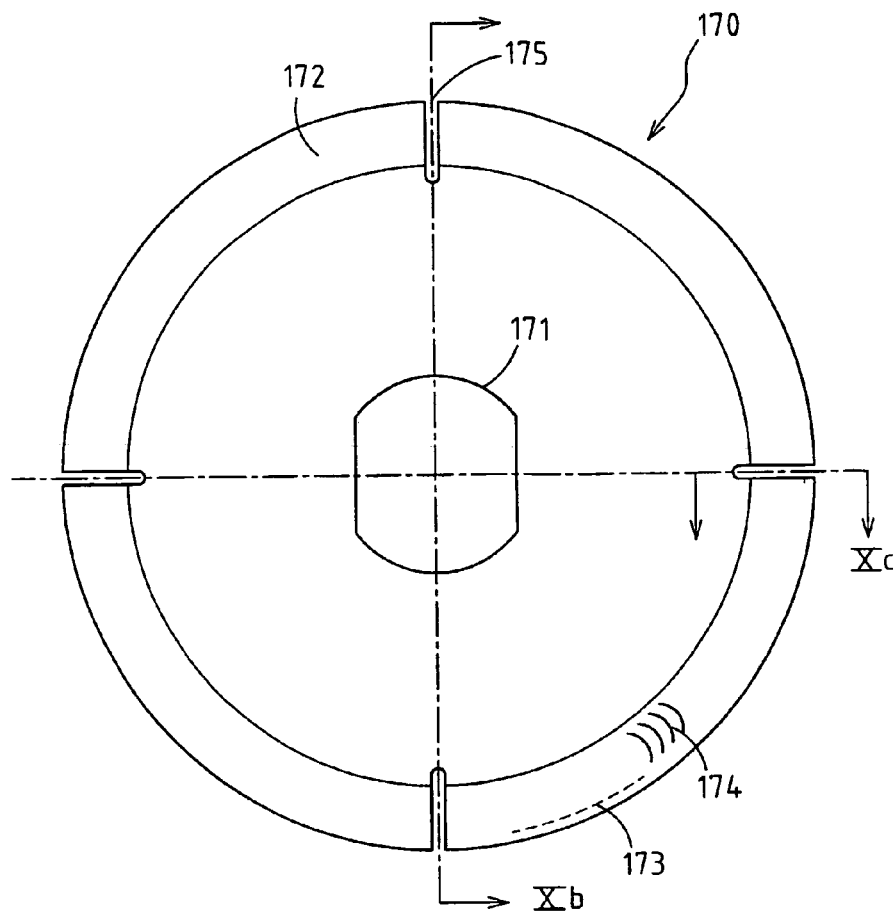
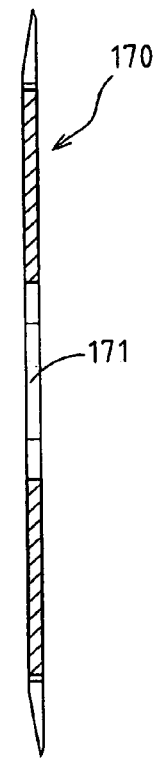
FIG. 10a.   FIG. 10b.
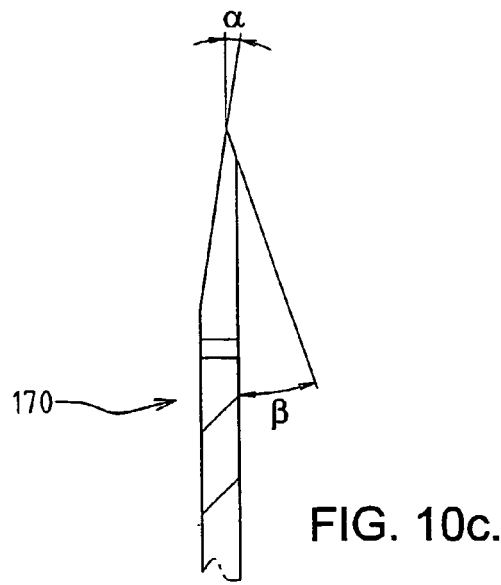
FIG. 10c.

METHOD AND DEVICE FOR REMOVING A BONE FROM AN EXTREMITY OF A SLAUGHTER ANIMAL

CROSS REFERENCE TO RELATED APPLICATIONS

This application is the U.S. national phase of International Application No. PCT/NL02/00696 filed on Nov. 1, 2002 and published in English as International Publication No. WO 03/039262 A2on May 15, 2003, which application claims priority to Netherlands Application No. 1019293 filed on Nov. 5, 2001, the contents of which are incorporated by reference herein.

The invention relates to a method for removing an elongate bone from a meat-comprising extremity or part thereof of a slaughter animal, in particular an extremity of a bird, such as a chicken, turkey, duck or the like, which bone has two opposite joint ends, which in the natural, e.g. unprocessed, state of the slaughter animal each form part of a different joint between the bone and another part of the slaughter animal, which method comprises the step of taking the bone out of the extremity at a first of the joint ends thereof, with a tissue connection between the extremity and the second joint end of the bone substantially being retained. The invention also relates to an assembly for carrying out the method. In the context of the invention, an extremity is understood as meaning a limb, i.e. a leg or a wing, the bone in question being a femur or a humerus. The extremity or a part thereof may be connected to the body of the slaughter animal before undergoing a boning operation according to the invention, but it is also possible for the extremity or part thereof to have been separated from the body prior to the boning operation.

A method of this type and an assembly of this type for boning a leg of poultry are known, for example, from U.S. Pat. No. 5,176,562. To prepare for the boning, a longitudinal cut is made manually along the thighbone and the drumstick bone, on the inner side of the leg, i.e. the side which faces the associated other leg in the natural position. Furthermore, a transverse cut is made manually at the knee joint, in order to partially sever connective tissue in that area, i.e. tendons and connecting muscles. Then, other tendons and connecting muscles are mechanically severed at the knee joint, and the thighbone is mechanically moved out of the thigh meat at the end facing the knee joint via the longitudinal cut which has been made, after which that end of the thighbone which faces the hip joint may still be connected to the thigh meat by means of connective tissue. The thighbone is later detached from the thigh meat if this has not already taken place. After an incision has been made at the tarsal joint, the drumstick meat is scraped off the drumstick of the leg in the direction of the knee joint thereof.

WO-A-00/59311 describes a boning operation in which a poultry leg is suspended by its tarsal joint. Suitable knives are used to automatically and mechanically make longitudinal cuts along the thighbone and the drumstick bone and also the transverse cut in the region of the knee joint. That section of the thighbone which adjoins the knee joint is then pressed out of the thigh meat, in the transverse direction with respect to the leg, by means of an arm. A guide presses the thighbone further out of the thigh meat, the thighbone remaining connected, at a hip joint end thereof, to the thigh meat and therefore to the extremity. Finally, the bone is separated from the extremity.

EP-A-0 763 326 describes a similar operation, in which the thighbone is manually cut out of the thigh meat.

The known method and device have the drawback that the thighbone is not mechanically removed from the leg with any degree of reliability. This requires manual inspection and further processing.

It is an object of the invention to provide a method and device in which a bone, such as a thighbone or a wingbone, is mechanically separated from an extremity, such as a leg or a wing, as part of a boning operation which can be carried out either in completely mechanised form or at most partially by hand.

Another object of the invention is to provide a boning operation in which an optimum quantity of meat is obtained, i.e. there is a minimal quantity of meat lost during the boning.

To achieve at least one of the above objects, the method according to the invention is characterized by the steps of moving the bone and the meat away from one another in the region of the second joint end of the bone; and breaking the tissue
connection between the extremity and the bone. In this way, the bone and the meat connected thereto are moved with respect to one another to various spatial locations, the bone and the meat being connected to one another only by means of connective tissue. This tissue connection can then be broken very effectively, with a minimal remainder of the tissue connection remaining on the second joint end of the bone.

As an optional preliminary processing operation on the extremity, a longitudinal cut can be made in the extremity, which longitudinal cut extends at least between the first and second joint ends of the bone, and a transverse cut can be made in the extremity at the first joint end in order to at least partially sever tissue connections in the vicinity of the first joint.

It is preferable for at least a section of the bone to be moved in its longitudinal direction with respect to a scraper device, towards the second joint end, in order to move the meat away from the bone in the region of the second joint end of the bone, in particular to beyond the second joint end. The bone may be stationary with respect to a point in space and the scraper device can move with respect to the said point, but it is also possible for the bone to be moved with respect to a stationary scraper device. It is also possible for both the bone and the scraper device to move with respect to a fixed point in space. Only the fact that the scraper device and the bone move relative to one another is of importance.

It is preferable for the tissue connection between the extremity and the bone to be broken by being cut through at the location of the scraper device, or by being pulled off. The first option has the advantage that the position where the tissue is broken is accurately determined, while the second option has the advantage of simplicity.

To achieve at least one of the above mentioned objects, an assembly according to the invention for removing an elongate bone from an extremity of a slaughter animal, which bone has two opposite joint ends which in the natural, for example unprocessed state of the slaughter animal each form part of a different joint between the bone and another part of the slaughter animal, comprises: means for taking the bone out of the extremity at a first of its joint ends, a tissue connection between the extremity and the second joint end of the bone substantially being retained, and the assembly is characterized by: means for moving the bone and the meat away from one another in the region of the second joint end of the bone; and separation means for breaking the tissue connection between the extremity and the bone.

The means for moving the bone and the meat away from one another in the region of the second joint end of the bone preferably comprise a scraper device which is adapted to scrape along the bone towards the second joint end of the bone, in particular to beyond the second joint end.

In the method and device according to the invention, a knife which extends substantially in a plane and has a first side and a second side, and is provided with a first cutting surface, which extends on the first side of the knife, at an angle of 8 –15°, in particular at an angle of 10 –11°, with respect to the plane of the knife, is preferably used to break connective tissue. To increase the effectiveness of the knife, it is possible to provide a second cutting surface, which extends on the first side of the knife, at an angle of 20 –40°, in particular an angle of 27 –33°, with respect to the plane of the knife. To further increase the effectiveness, the knife may be provided with a third cutting surface, which extends on the second side of the knife, at an angle of 10 –20°, in particular at an angle of 15°, with respect to the plane of the knife.

It is preferable for the knife to be circular and for it to be provided with at least one radial, in particular elongate recess along a circumferential edge thereof. The recess preferably is substantially U-shaped or V-shaped.

It is preferable for at least the cutting surface to be provided with a layer of TiN or CrN.

The knives according to the invention are highly effective, have a long service life and have a very favorable service life/cost ratio, while the level of staining during use is acceptable.

Other claims, features and advantages of the invention will become clear with reference to the appended drawing, which shows non-limiting exemplary embodiments and in which:

FIG. 1 shows a perspective view of a thighbone removal device;

FIGS. 2a, 2b and 2c respectively show a perspective front view, a side view and a perspective rear view of a thighbone removal component of the thighbone removal device shown in FIG. 1;

FIGS. 3a and 3b show perspective views of the transfer of the thighbone to the thighbone removal component of FIGS. 2a–2c;

FIG. 4b shows a perspective view of a variant of the thighbone removal device shown in FIG. 4a;

FIG. 6 shows a perspective view of a wingbone removal device, in which the wingbone is handled in a first way;

FIGS. 7b and 7c show a detailed view of the way in which the wingbone is handled in accordance with FIG. 7a;

Figures 9A, 9B:
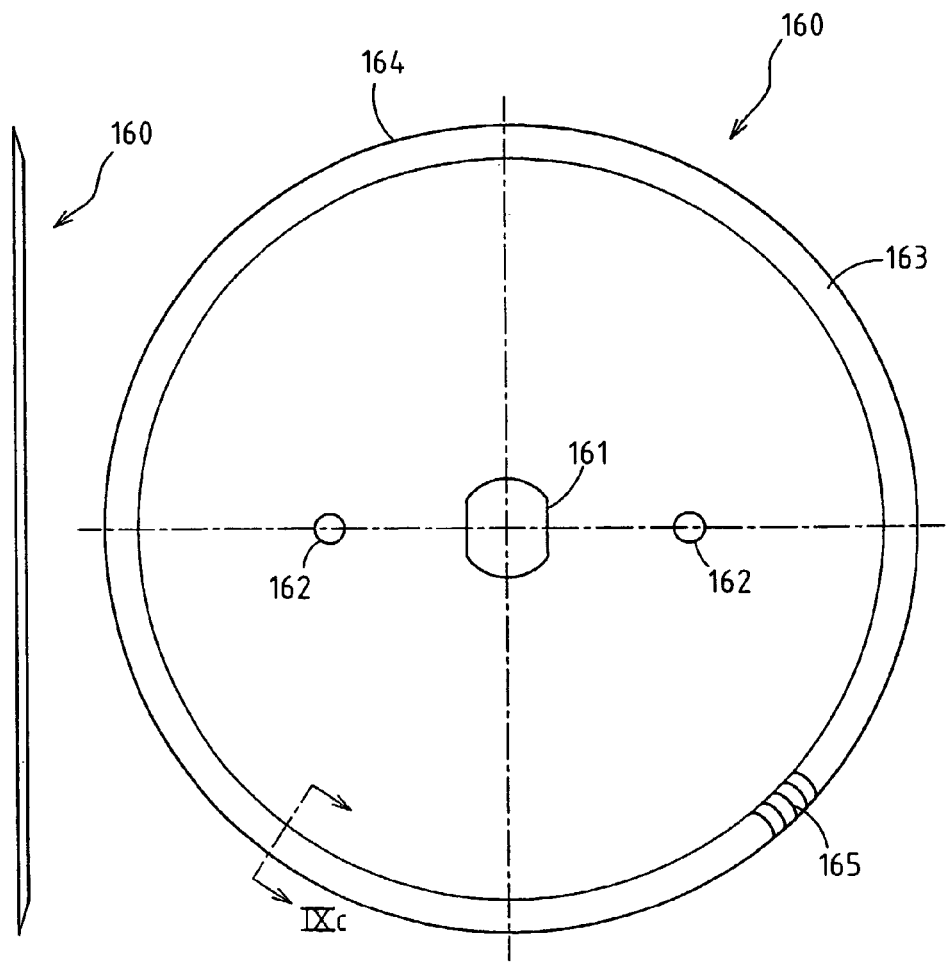
Figure 9C:
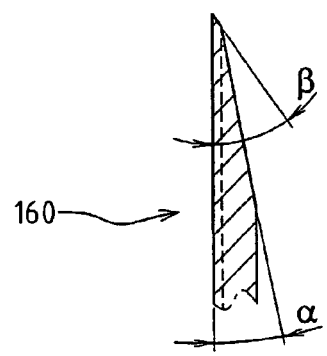
Figures 11A, 11B:
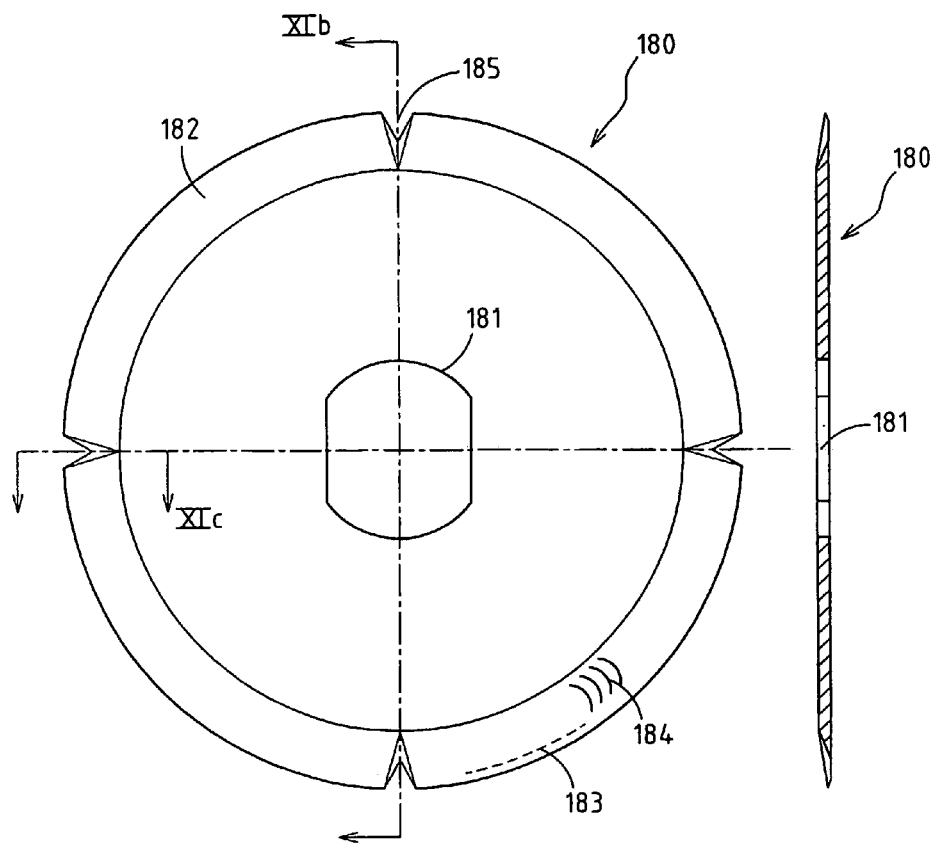
Figure 11C:
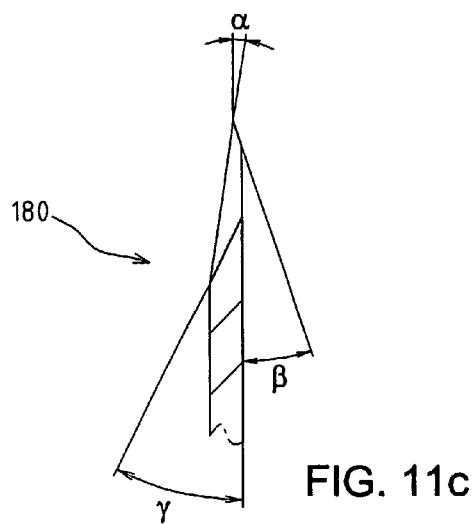
Figures 12A, 12B:
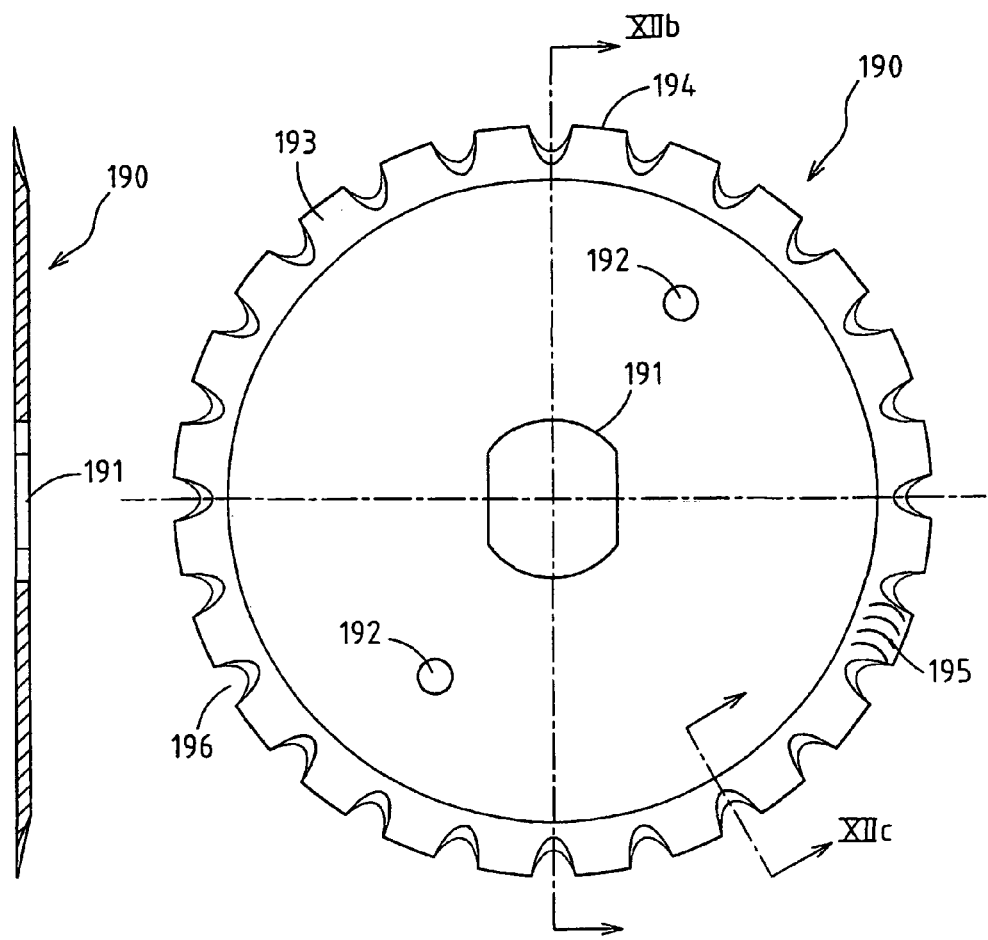
Figure 12C:
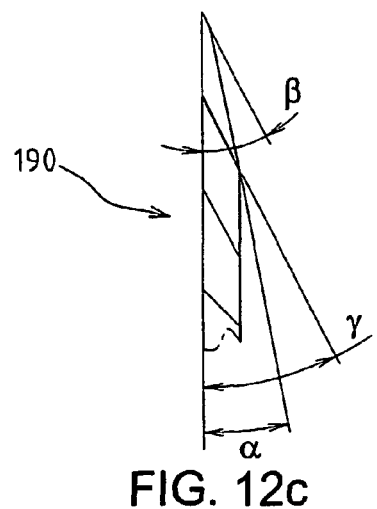

FIGS. 9a, 9b and 9c respectively show a front view, a side view and a detailed view in cross section of a rotatable knife in a first embodiment;

FIGS. 10a, 10b and 10c respectively show a front view, a cross section and a detail in cross section of a rotatable knife in a second embodiment;

FIGS. 11a, 11b and 11c respectively show a front view, a cross section and a detail in cross section of a rotatable knife in a third embodiment; and FIGS. 12a, 12b and 12c respectively show a front view, a cross section and a detail in cross section of a rotatable knife in a fourth embodiment.

Throughout the various figures, identical reference numerals denote identical components or components with an identical function.

Figure 1:
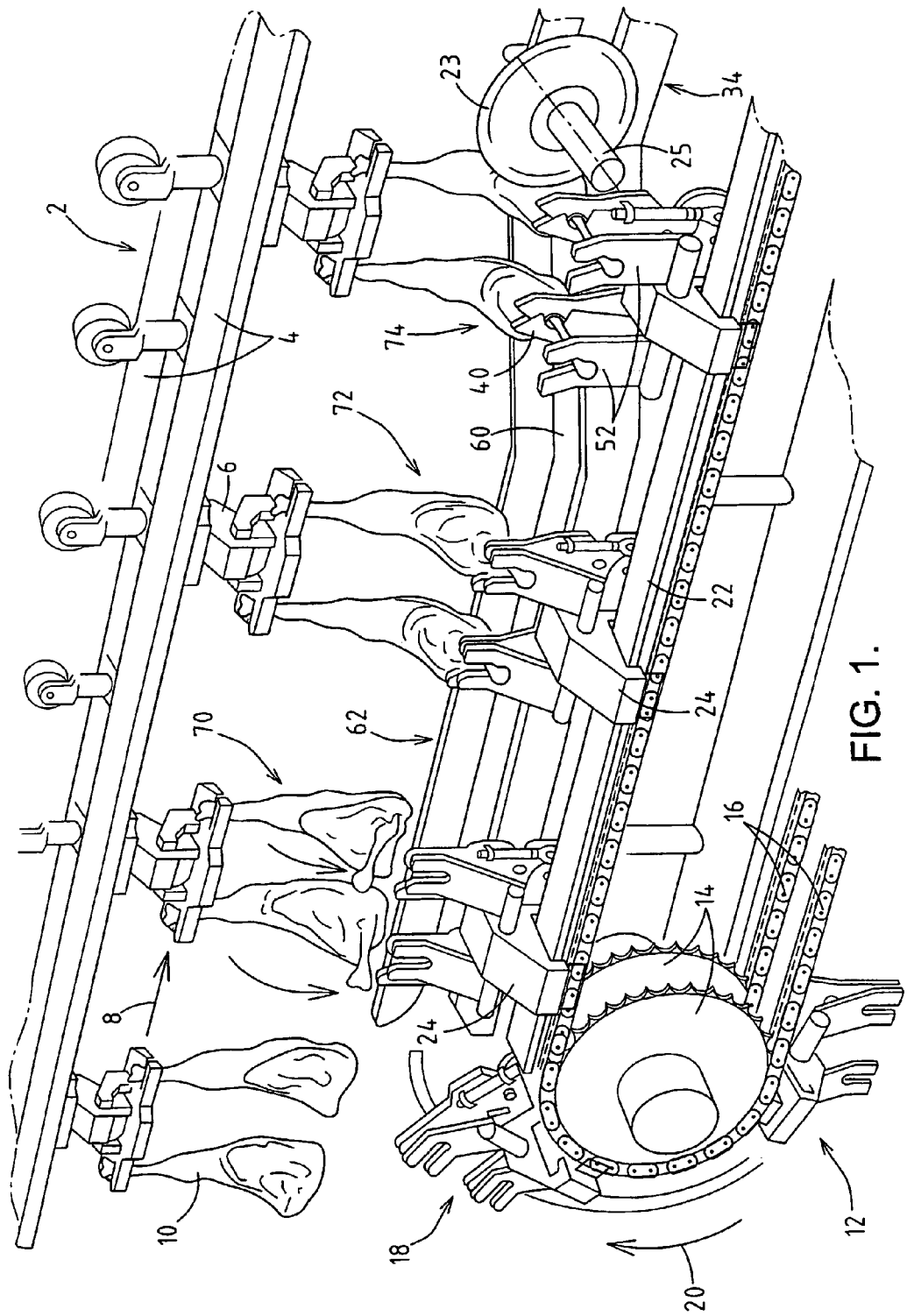
Figure 2B:
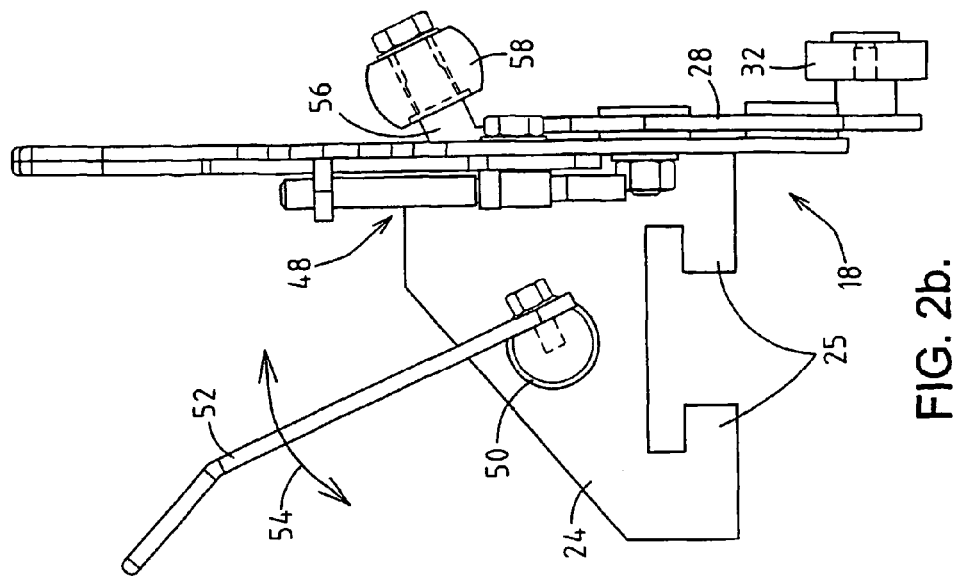
Figure 2A:
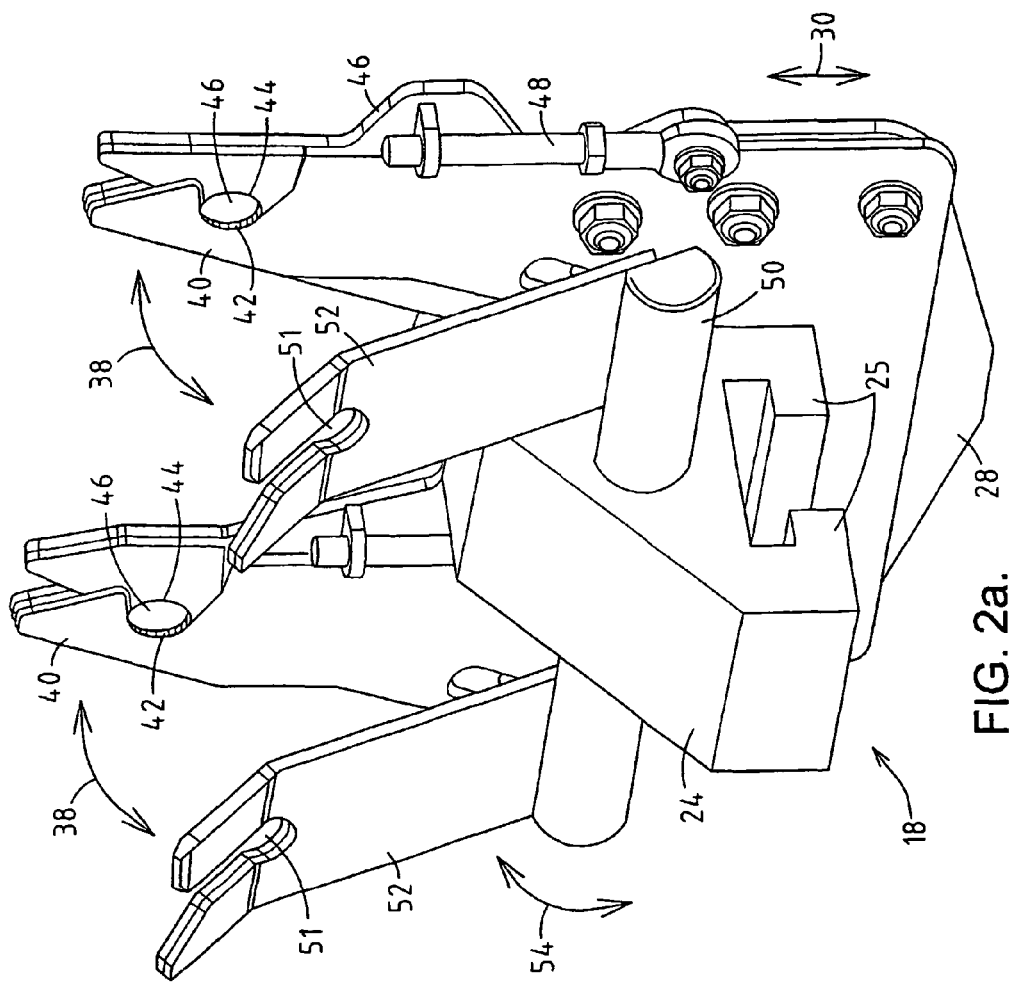
Figure 2C:
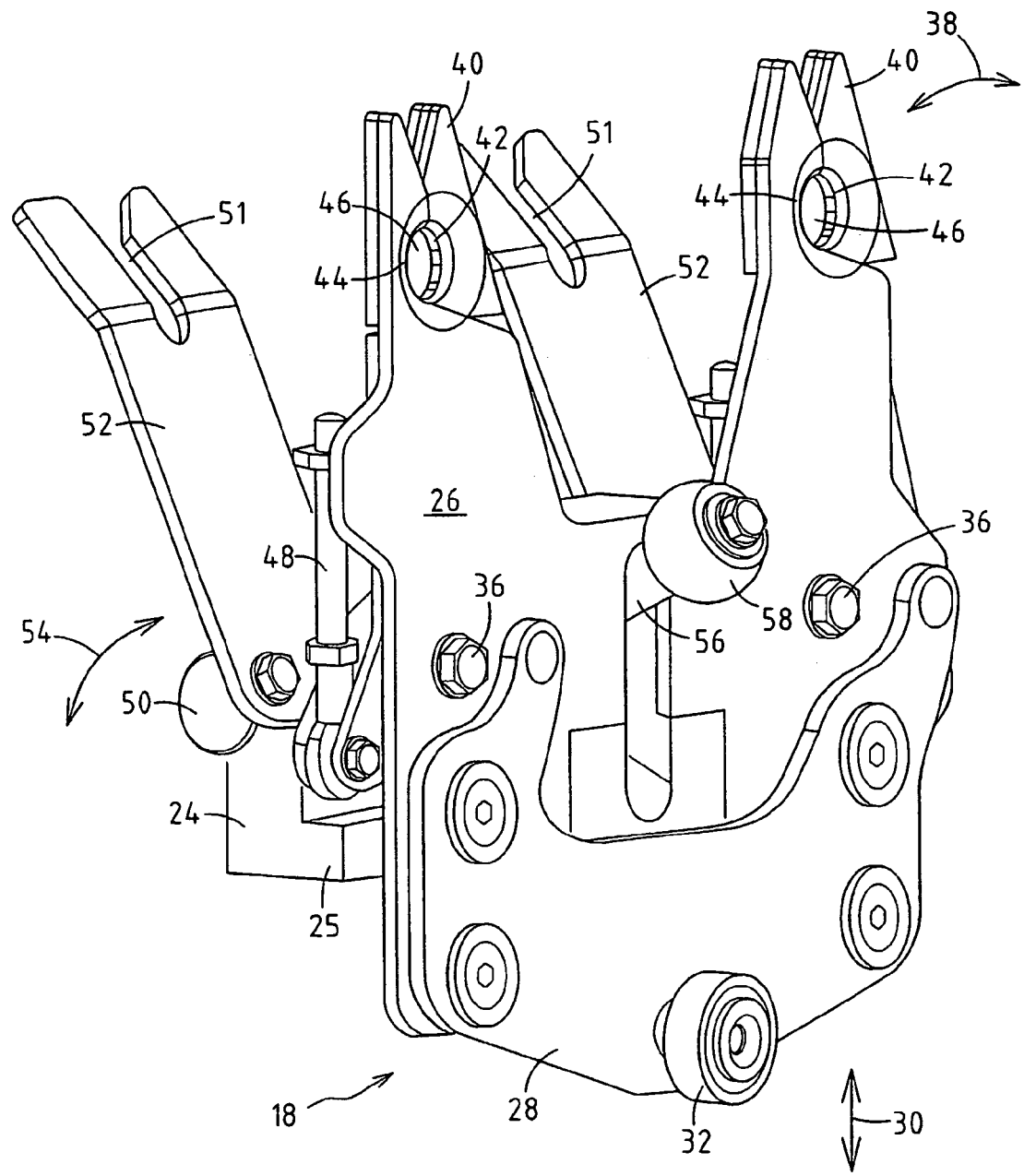

FIG. 1 shows a conveyor 2 with rails 4 along which hooks 6, which are known per se, are advanced in the direction of arrow 8 in a manner which is not shown in more detail but is known per se, for example by a driven chain to which each hook 6 is connected. Each hook 6 is adapted to support two legs 10 of a slaughter animal at the tarsal joint thereof. It should be noted that it is also possible to use hooks which are adapted to support one leg or more than two legs.

Beneath the conveyor 2 a conveyor 12 is situated, in which chains 16, which are driven by sprocket wheels 14, are used to advance thighbone removal components 18 in the direction indicated by arrow 20. When the thighbone removal components 18 are moving along a rail 22 of the conveyor 12, they are moving substantially parallel to and synchronously with the hooks 6.

Finally, a rotatable knife 23, which is driven via a spindle 25 in a manner which is not shown in more detail, is arranged in a fixed position with respect to the conveyor 12.

The thighbone removal components 18 which are shown in FIGS. 1 and 2a–2c each comprise a body 24 which is provided with claws 25 which are adapted to engage around the rail 22. A base plate 26 is fixedly secured to the body 24 and a control plate 28 can move with respect to the base plate, in the directions indicated by double arrow 30. The control plate 28 is provided with a cam or freely rotatable wheel 32 which, by interacting with a suitable guide 34 which is positioned next to the path of the thighbone removal component 18, is responsible for providing the desired displacement of the control plate 28 with respect to the base plate 26. Two arms 40, which can pivot about a pin 36 in the directions indicated by double arrow 38, are arranged on the base plate 26. Each arm 40 has a substantially semicircular recess 42 which is associated with a substantially semicircular recess 44 of the base plate 26 in order to form a scraper opening 46. A spring 48, which acts between the base plate 26 and each arm 40 and at its ends is connected to said respective components, ensures that each arm 40 is forced towards the base plate 26 in order to form a closed scraper opening 46. By contrast, a downward displacement of the control plate 28 with respect to the base plate 26 ensures that the arms 40 pivot counter to the biasing force of the spring 48 in order to move the recesses 42 and 44 away from one another for opening the scraper opening 46.

On the body 24 there is a pin 50 which bears arms 52 provided with recesses 51 and is pivotable in the directions indicated by double arrow 54. The pin 50 is connected, in the body 24, to a pin 56, which projects through a slot in the base plate 26 and bears a roll 58 at one end. An upward or downward movement of the roll 58, for example as a result of the roll being guided in a groove 60 (FIG. 1) of a guide 62 which is arranged in a fixed position along the path of the thighbone removal component 18, leads to pivoting of the pin 50 and consequently to movement of the recesses 51 away or towards the scraper opening 46, respectively.

The device shown in FIG. 1 operates as follows. Legs 10 are supplied on the left-hand side of the figure in the conveyor 2 in the direction indicated by the arrow 8. The hooks 6 from which the legs 10 are suspended move synchronously with the thighbone removal components 18, each leg 10 moving at the location of a scraper opening 46 of one of the thighbone removal components 18. Before the legs 10 reach the conveyor 12 or while the legs 10 are moving over the conveyor 12, the thighbone is partially detached from each leg 10 by detaching the tendon connections at the knee joint and tilting the thighbone downwards about the connection between the thighbone and the leg, which is still at least partially intact, at the location of the hip joint. The scraper opening 46 is opened as a result of the arms 40 being pivoted away from the base plate 26 through the wheel 32 being moved downwards with respect to the base plate 26. As an alternative, the wheel 32 can be moved downwards with respect to the base plate 26 to such an extent that the spring force of spring 48 is substantially overcome but the scraper opening 46 remains closed; the arm 40 can then be pivoted with respect to the base plate 26 using very little force. As illustrated at 70 and 72, each thighbone which has been partially detached is on the one hand placed in the recesses 42 and 44 between an arm 40 and the corresponding part of the base plate 26, and on the other hand is placed in the recess 51 in the arm 52. The scraper opening 46 is then closed again, c.q. the complete spring force of the spring 48 is restored by releasing the wheel 32.

The dimensions of the recess 51 are such that one end of the thighbone, at the knee joint side thereof, cannot pass through the recess 51. The dimensions of the scraper opening 46 are substantially such that the thighbone can pass through it, including the end of the thighbone on the hip joint side, the spring 48 ensuring that the scraper opening 46 can widen if necessary in order to allow the latter end of the thighbone pass. The oyster connected to the thighbone cannot pass the scraper opening 46. At 74 it is illustrated that next moving the arms 52 away from the scraper opening 46 leads to the thighbones being displaced through the scraper openings 46 in the longitudinal direction thereof, the ends of the thighbones ultimately passing the scraper opening 46 on the hip joint side and being located on that side of the arms 40 which faces the arms 52. In fact, the arms 52 move so far away from the base plate 26 that even a thighbone with the maximum possible length will reliably pass the scraper opening 46. Then, the arms 52 are moved in the opposite direction over a distance which is such that the ends of the thighbones, irrespective of the length thereof, come to bear against the base plate on the hip joint side as a result of the tension in the tissue connections of the thighbones to the remainder of the legs. In this state, the thighbone removal component 18 moves past the knife 23 and the thighbone is cut off the thigh meat.

FIGS. 3a and 3b illustrate a way in which a thighbone can be partially detached from a leg 10 by hand and can be positioned in the thighbone removal component 18 (corresponding to FIG. 1) at 72. As a preliminary processing operation, a longitudinal cut has already been made along the entire length of the leg 10 on that side of the leg 10 which in the natural position faces the other leg. The preliminary processing operation has also seen a transverse cut made at the knee joint. This transverse cut has only a limited depth, in order to ensure that the kneecap remains connected to the drumstick bone when the drumstick is removed in a later stage. As shown in particular in FIG. 3a, after the preliminary processing operation the end of the thighbone on the knee joint side thereof is cut off with the aid of a wizard knife 80 (an endless knife in band form which is driven in its longitudinal direction with respect to a handle) handled by a person and is taken hold of. The thighbone is then pulled out of the leg 10 on the knee joint side, the thighbone tilting about the still partially intact connection between the thighbone on the hip joint side and the thigh meat. Then, the thighbone, as illustrated in FIG. 3b, is placed into the recess 51 and the scraper opening 46 with the aid of the wizard knife 80. This is followed by the processing as illustrated in FIG. 1 at 74.

Figure 3C:
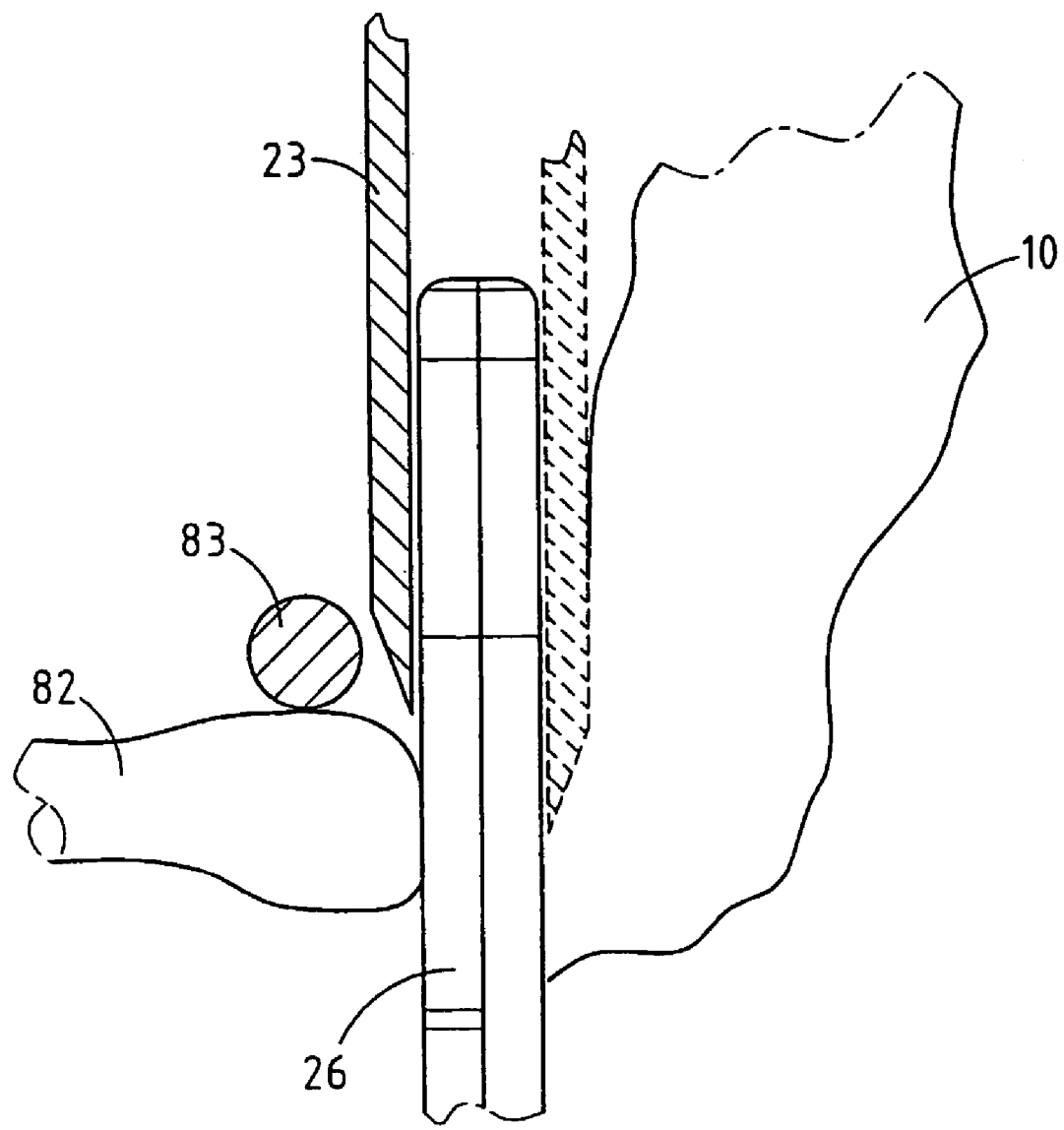
FIG. 3c shows a side view of the way in which the thighbone is cut off a limb.

FIG. 3c illustrates in particular the processing which is carried out by the knife 23 (FIG. 1), starting from the positioning of a thighbone 82 which is reached at 74 in FIG. 1. The base plate 26 moves past the knife 23 at a very short distance and in the process cuts in the region of the scraper opening 46 on the side of the base plate 46 which faces the arms 52. However, it is also possible, as indicated by dashed lines in the Figure, for the knife to be arranged in such a manner that it cuts in the area of the scraper opening 46 on the opposite side of the base plate 26. The result of the cutting operation by the knife 23 is that the thighbone 82 is separated from the leg 10. Parallel to the path of the thighbone removal component 18 there may be a guide 83 which presses the thighbone 82 downwards in order to improve the positioning of that end of the thighbone 82 which rests against the base plate 26. This prevents this thighbone end, which is rounded in shape, from projecting into the scraper opening 46, so that the knife 23 does not cut into the end of the thighbone. The guide 23 furthermore ensures that loosely hanging pieces of meat are kept away from the knife 23.

The thighbone 82 which has remained in the thighbone removal component 18 is then disposed of in a suitable way, so that the thighbone removal component 18 is ready for its next use.

Figure 4A:
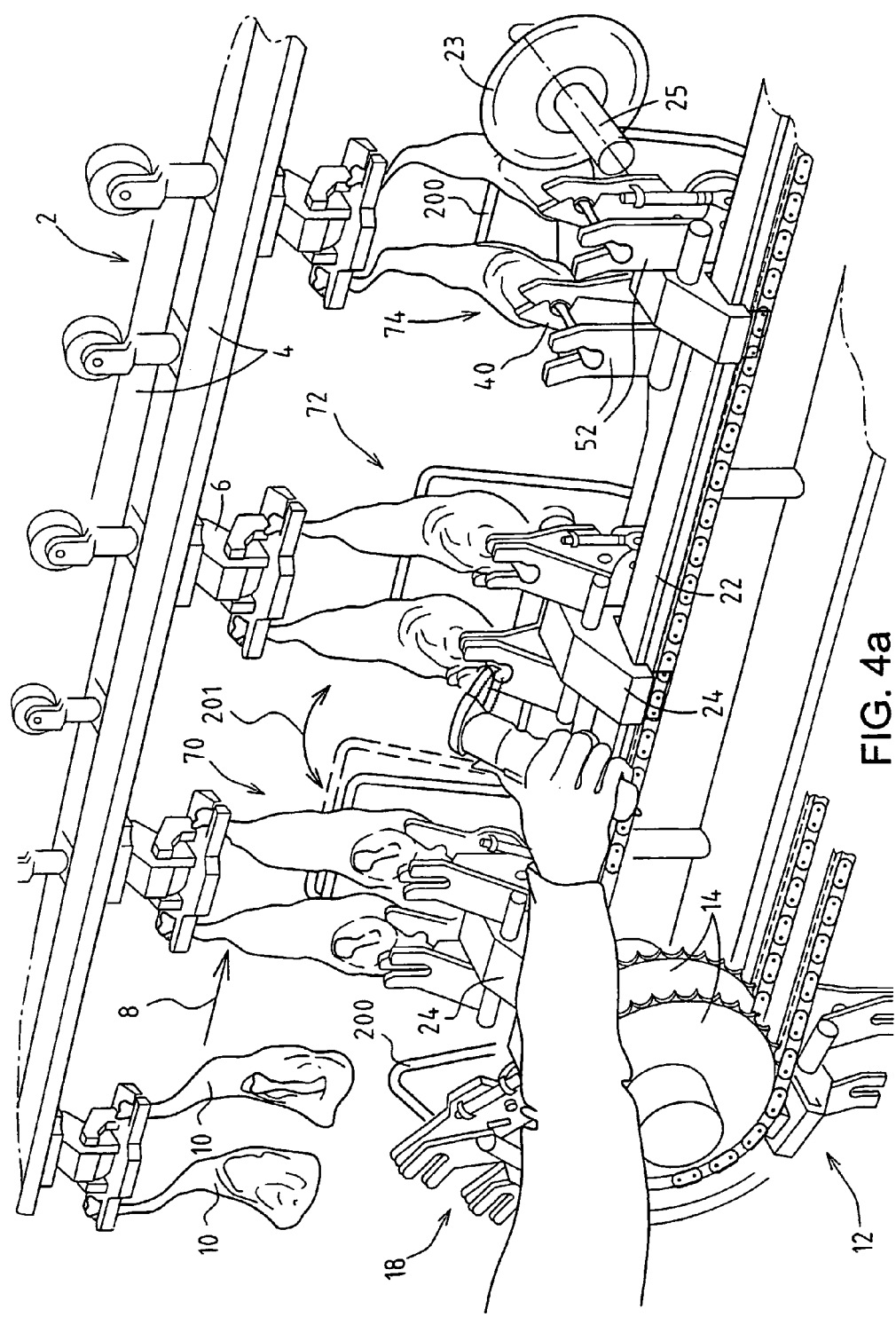
FIG. 4a shows a perspective view of a variant of the thighbone removal device shown in FIG. 1.

The device shown in FIG. 4a substantially corresponds to the device shown in FIG. 1. For the sake of clarity, the guide 62 has been omitted from the Figure. One difference with respect to FIG. 1 lies in the addition of movable brackets 200 in the device shown in FIG. 4a, which brackets 200 are designed to move synchronously with the displacement of the legs 10 and are also designed to move transversely with respect to the direction of the arrow 8, in the directions indicated by double arrow 201, between a first position outside the path of the legs 10 (shown by dashed lines) and a second position in the path of the legs 10. The way in which the brackets 200 are driven is not shown in more detail and can easily be implemented by a person skilled in the art. The brackets 200 push the legs 10 towards the associated thighbone removal component 18, so that the manual operation of gripping the thighbone and pulling it out of the thigh meat, which operation has been described in detail above with reference to FIGS. 3a and 3b, can be carried out more easily and more quickly, since the brackets 200 position and support the legs 10. Instead of a bracket 200, it is also possible to use any other moving or stationary support member to fulfill a similar function. The device shown in FIG. 4b substantially corresponds to that shown in FIG. 4a. One difference lies in the addition of at least one mechanical arm 202 with a number of degrees of freedom of movement. The arm 202 is driven in a suitable way, for example with the aid of electric, pneumatic and/or hydraulic motors. At its free end, the arm 202 is provided with a wizard knife 80 and is furthermore controlled in such a manner that substantially the same function of gripping a thighbone and removing it from the thigh meat can be performed as has been explained for a manual treatment with reference to FIGS. 3a and 3b. For this purpose, by way of example, sensors (not shown in more detail) are provided which control the position of the wizard knife 80 with respect to the relevant thighbone and the associated thighbone removal component 18, so that a thighbone is moved into the scraper opening 46 and the recess 51 in the desired way. The use of the brackets 200 in combination with the arm 202 is useful but not necessary; the arm 202 can be used even if the brackets 200 are not present.

Figure 4B:
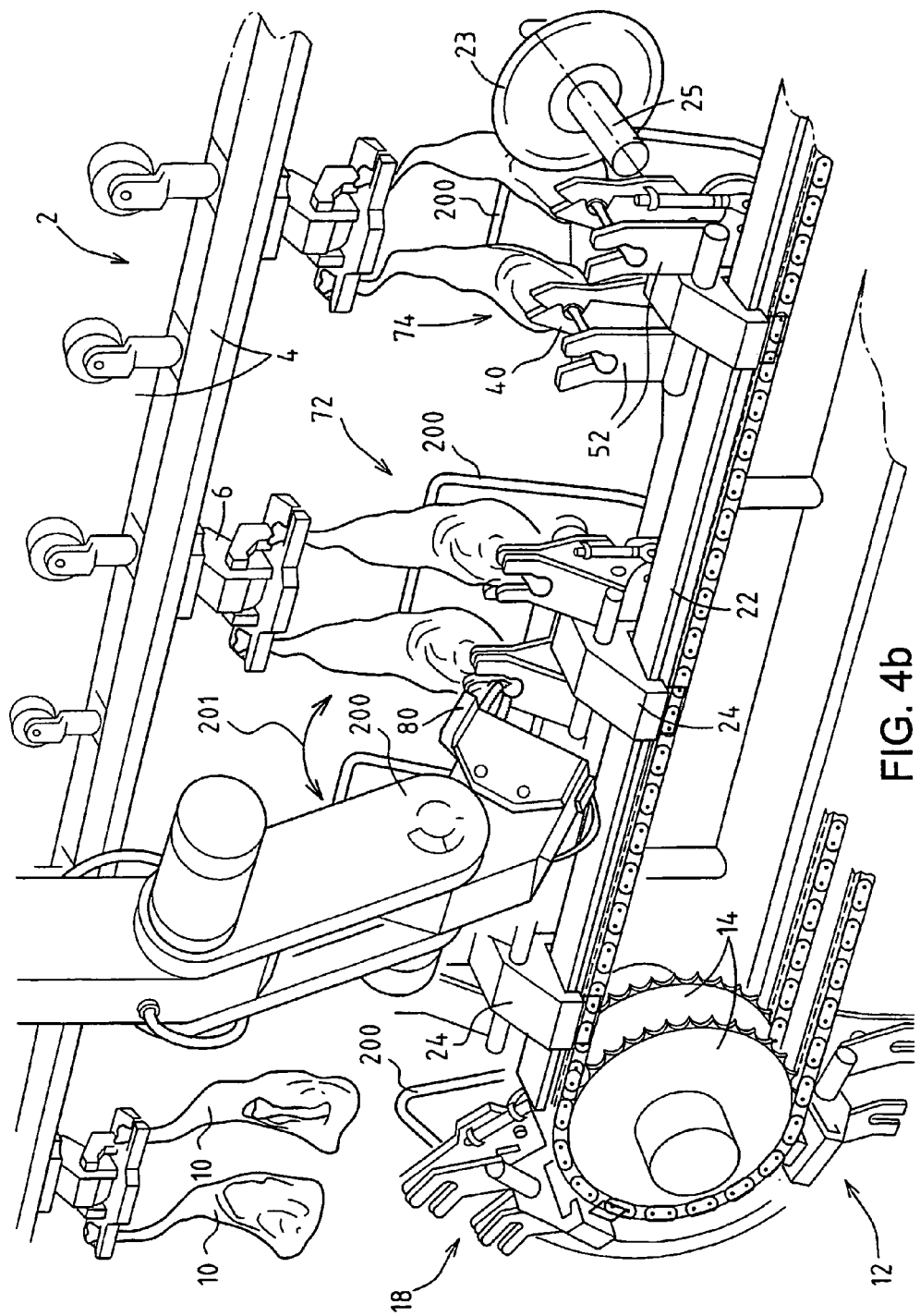
Figure 4C:
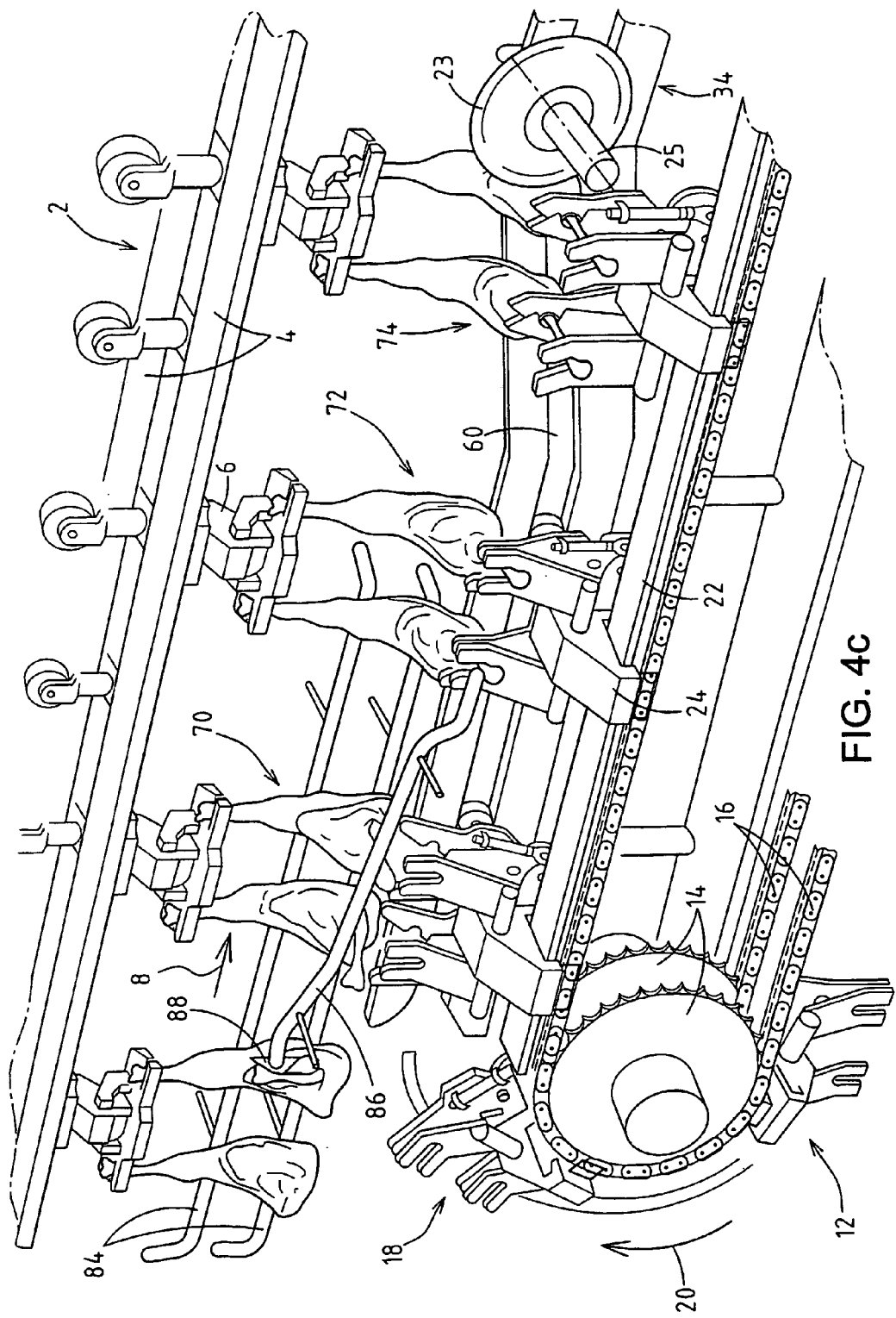
FIG. 4c shows a perspective view of another variant of the thighbone removal device shown in FIG. 1.

The device shown in FIG. 4c substantially corresponds to that shown in FIG. 1. One functional difference is the automatic operation of the device shown in FIG. 4c. One structural difference in this respect comprises the addition of guides 84 for laterally supporting legs 10 moving past. Furthermore, a guide 86 is provided which is arranged opposite the guides 84. The guides 84, 86 are connected to a frame in a suitable manner (not shown in more detail). The guide 86, which is directed obliquely downwards, is provided, at its upstream end, with an ejector element 88. While the legs are being conveyed along the guides 84, 86, the ejector element 88 moves into the legs behind the thighbones. Then, the thighbones are tilted out of the legs along the guide 86 and positioned in the recesses 51 and the scraper openings 46, after which the processing operations which have already been described with reference to FIG. 1, for further removal of the thighbones from the legs 10, take place.

Figure 5:
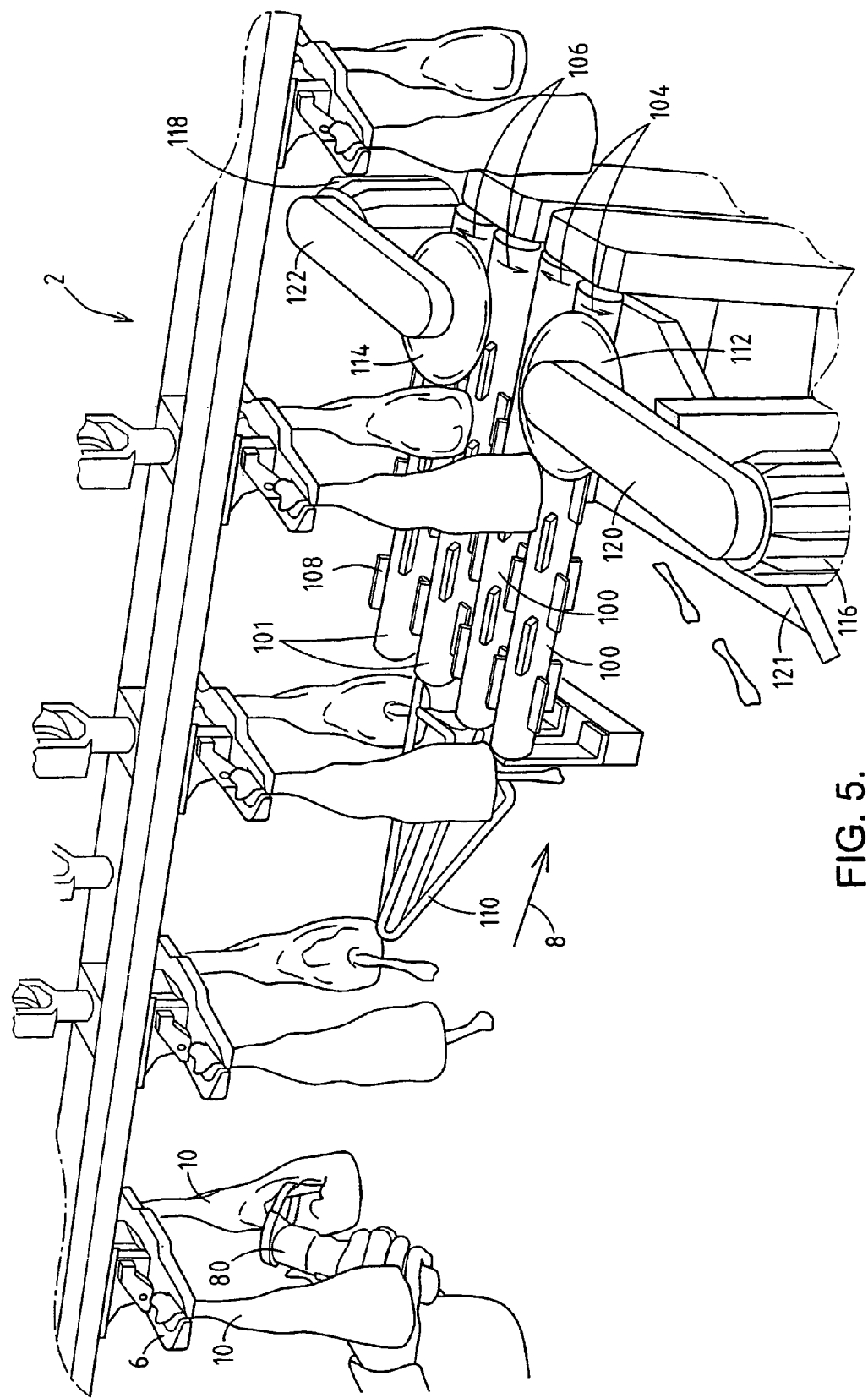
FIG. 5 shows a perspective view of an alternative thighbone removal device.

FIG. 5 shows an alternative device for the removal of thighbones from legs 10. Beneath the conveyor 2 there are two sets of rolls 100, 101 which can rotate about their longitudinal axis and are driven in a manner which is not shown in more detail. The rolls 100 rotate in opposite directions 104, as do the rolls 101, which rotate in opposite directions 106. The rolls 100, 101 are provided with projections 108, preferably made from a flexible material. In addition, at least one roll of each set of rolls may be provided with means for conveying legs 10 which are in contact with the rolls in the longitudinal direction of the rolls 100, 101. Each set of rolls 100, 101 delimits a gap to which a guide 110 leads. Above the rolls 100, 101 there are knives 112 and 114, respectively, which are adapted to be active above the gap of the associated set of rolls. The knives 112, 114 are driven in rotation by respective motors 116, 118 via respective transmissions 120, 122.

The device shown in FIG. 5 operates as follows. Moving from the left to the right in the Figure, in the direction indicated by the arrow 8 of transport of the legs 10, first of all the thighbones are at least partially detached from the thigh meat with the aid of a manual operation using a wizard knife 80 (cf. FIG. 3a). Obviously, it is also possible for this operation to be performed at the desired position in a manner which has been described with reference to earlier FIGS. Then, the thighs of the legs 10 are guided via the guide 110 to the gaps between the rolls 100 and 101, respectively. In each gap, the thigh meat is engaged by the projections 108 on the rolls 100, 101 and pushed upwards through the gap between the rolls 100, 101. The thighbones cannot pass through the gap between the rolls 100 and 101, with the result that the remaining connections between the thighbones and the thigh meat are placed under prestress, and in some cases are broken. Connections which are not broken as a result of the action of the projections 108 are severed by the knives 112, 114. In both cases, the tissue connections between the thighbones and the remainder of the legs are ultimately broken, and the thighbones are discharged onwards, for example via a chute 121. The legs, from which the thighbones have been removed, then continue on their way in the conveyor 2.

Figure 5A:
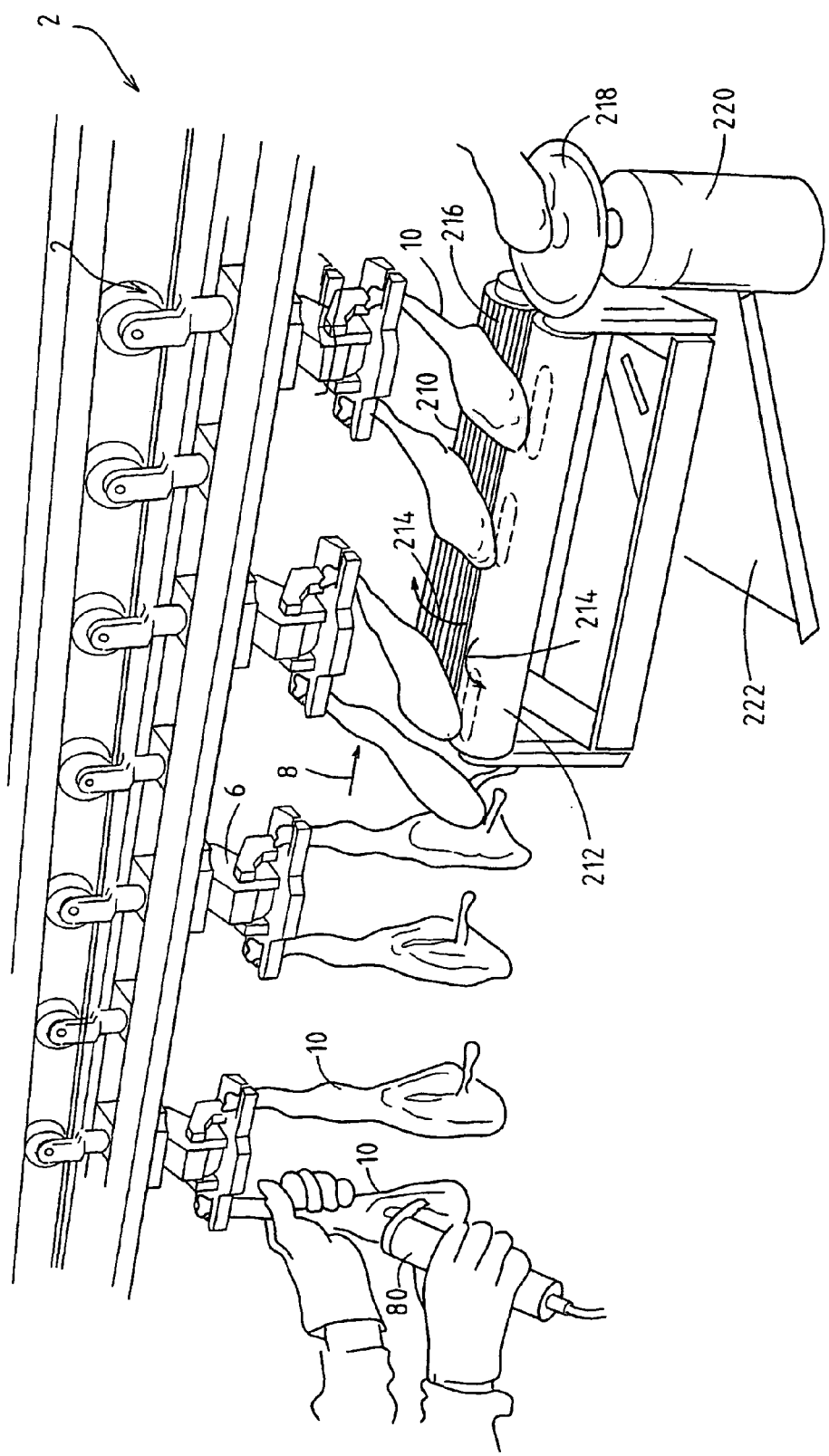
FIG. 5a shows a perspective view of yet another thighbone removal device.

The above-described action of each set of rolls 100, 101 can also be obtained in a device in which one of the rolls is smooth or is replaced by a static guide which extends parallel to the other roll. An embodiment of this type is shown in FIG. 5a. Beneath the conveyor 2 there is a set of rolls 210, 212 which can rotate about their longitudinal axes and are driven in a manner which is not shown in more detail. The rolls 210, 212 rotate in mutually opposite directions 214. The roll 210 is provided with longitudinal ribs 216 or some other type of profiling, preferably made of a flexible material. The roll 212 has a substantially flat surface. The longitudinal ribs 216 or other profiles may also be arranged on roll 212 instead of on roll 210, or both on roll 210 and on roll 212. At least one of the rolls 210, 212 may be provided with means for conveying legs 10 which are in contact with the rolls 210, 212 in the longitudinal direction of the rolls 210, 212. The set of rolls 210, 212 delimits a gap with a width which is such that a thighbone cannot pass through the gap. At the downstream end of the gap (as seen in the direction of the arrow 8) a knife 218 is arranged. In the embodiment shown, the knife is in disc form and is driven by a motor 220, but it is also possible for the knife to be static. Below the knife 218 there is a chute 222.

The device shown in FIG. 5a operates as follows. Starting from the left and moving towards the right as seen in the Figure, in the direction of arrow 8 of transport of the legs 10, firstly the thighbones are at least partially detached from the thigh meat with the aid of a manual processing operation using a wizard knife 80 (cf. FIG. 3a). Obviously, it is also possible to carry out this operation in a manner which has been described with reference to previous figures. If necessary, the legs 10 are rotated about a vertical axis in such a manner that the thighbones are on the front side of the legs 10, as seen in the direction of transport. The rolls 210, 212 are arranged in the path of the legs 10 in such a manner that the thighbones of the legs 10 end up beneath the gap between the rolls 210, 212. They are then unable to pass through the gap, despite the direction of rotation 214 of the rolls 210, 212. The rotation of the rolls 210, 212 causes any thigh meat which is situated in the gap to be moved upwards out of the gap, so that this thigh meat comes to rest substantially on the rolls. The knife 218 which is located downstream of the rolls then breaks the connection which still exists at the location of the hip joint end between the thighbone and the thigh meat, after which the thighbone is discharged via the chute 222 and the leg 10 continues onward in the direction indicated by arrow 8.

FIG. 6 illustrates the removal of the humerus from wings of slaughtered poultry using substantially the same device as that which has already been discussed with reference to FIGS. 1, 2a–2c, 3a–3c and 4a for removal of the femur. Since the dimensions of the humerus and the femur differ, the dimensions and movement distances of the active components of the device shown in FIG. 6 may differ from those used in the previous devices, but their basic operation remains the same.

The device shown in FIG. 6 operates as follows. Carcasses 230 of poultry are supplied by conveyor 2 in the direction indicated by arrow 8, as indicated on the left-hand side of the Figure. In a preceding processing step, the shoulder joints of the carcasses 230 have at least in part been subjected to incisions, preferably substantially on the hip side of the location where the wing 232 is joined to the body 234. The shoulder joint may have been dislocated, and the incision may extend into or through the joint. A tissue connection between the wing 232 and the body 234 is retained. Furthermore, the elbow joint has been severed in a previous processing step.

As shown for the carcass 230a, the body 234 of the carcass 230a has been displaced in the direction of a wingbone removal component 236 by the bracket 200, the shoulder joint end of each humerus being cut out (if necessary) with the aid of a wizard knife 80 and the humerus being taken hold of and placed into the opened scraper opening 46 and the recess 51 (FIG. 2c) of the associated wingbone removal component 236. Then, the scraper opening 46 is closed, as indicated at carcass 230b. The shoulder joint end of the humerus cannot pass the recess 51, so that the humerus is pulled out of the wing meat when the arm 52 is tilted (indicated at carcass 230c), and this wing meat is retained by the base plate 26. The wings 232, from which the humerus has been removed in this way, remain connected to the body 234 of the carcass 230 via a tissue connection.

Figure 7A:
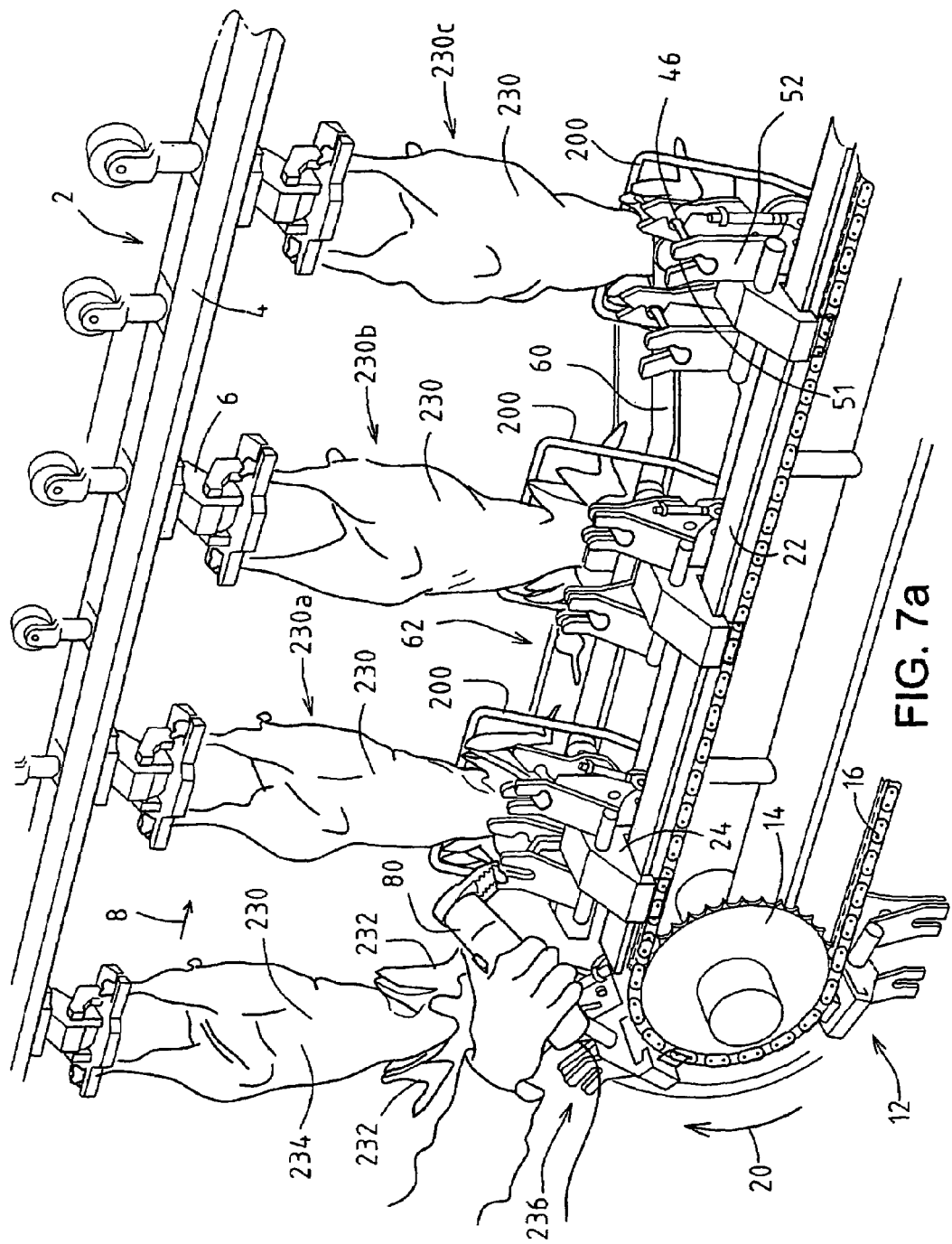
FIG. 7a shows a perspective view of a wingbone removal device, in which the wingbone is handled in a second way.

The device shown in FIG. 7a substantially corresponds to the device shown in FIG. 6. The way in which the humerus is removed differs, however. As shown in detail in FIG. 7b for the carcass 230d in FIG. 7a, in an initial processing step a longitudinal incision has been made in the wing 232 along the humerus, and the elbow joint has been dislocated or severed. The shoulder joint may optionally have undergone a prior processing operation, such as an incision or a dislocation. As illustrated in FIG. 7c for the carcass 230e in FIG. 7a, the wizard knife 80 is used to take hold of the elbow joint end of the humerus and take it out of the wing 232, after which the removal of the humerus which has been described above with reference to FIG. 6 takes place. However, according to FIG. 6, the shoulder joint end of the humerus rests against the arm 52, while according to FIG. 7a the elbow joint end of the humerus rests against the arm 52.

It will be clear that manual gripping of the humerus, as shown in FIGS. 6, 7a and 7c, can also be carried out using a mechanical arm as shown in FIG. 4b.

In accordance with the description given above in connection with the wings, it is also possible for a thighbone to be removed from a leg if the leg is still connected to the carcass, by making an incision at the hip joint, and if appropriate also at the knee joint, and then gripping the hip joint end of the thighbone and removing the thighbone using a thighbone removal device as described above. It is also possible, after an incision has been made at the knee joint, and if appropriate also at the hip joint, for the knee joint end of the thighbone to be gripped in order for the thighbone then to be removed.

Figure 8:
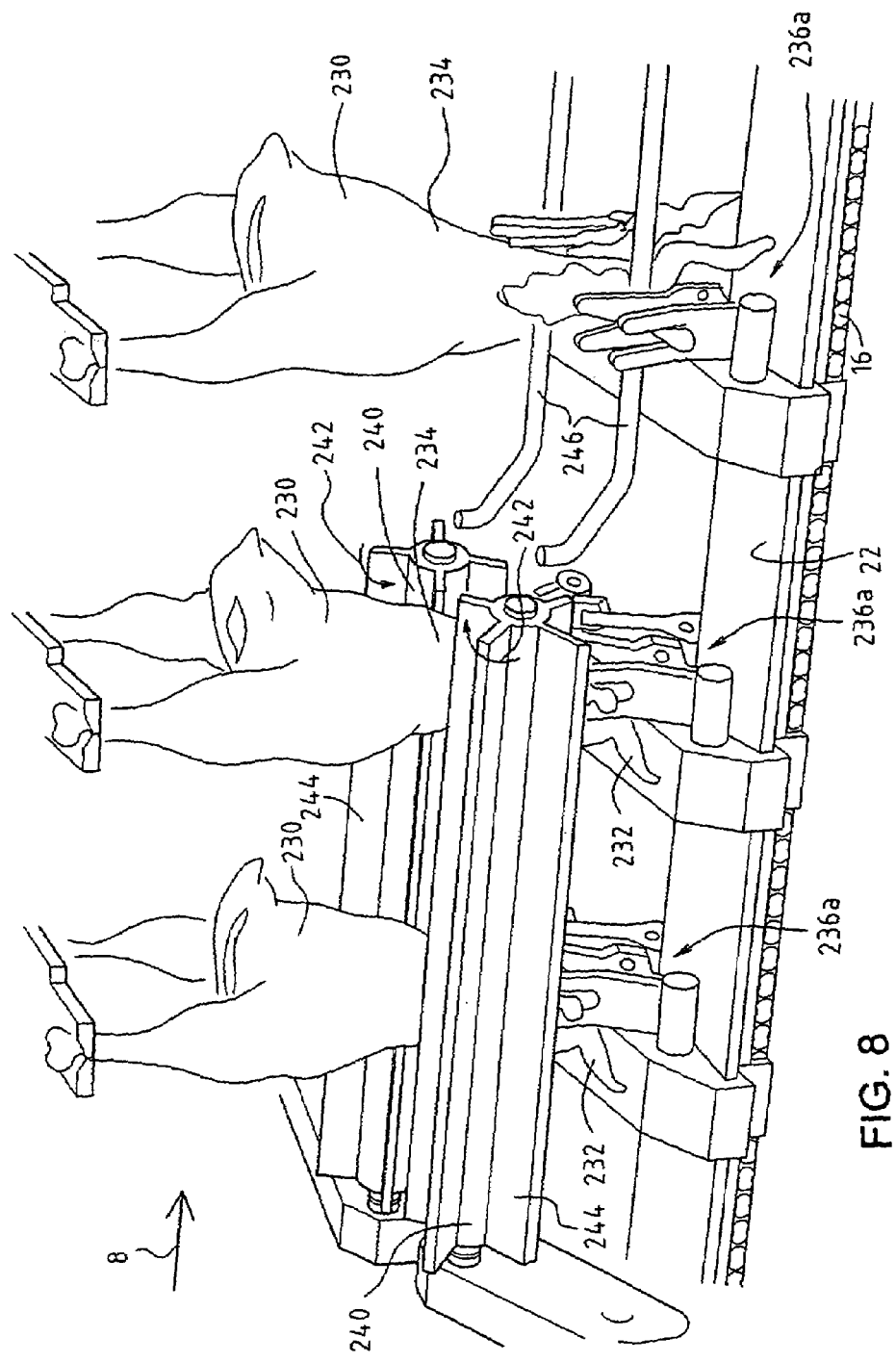
FIG. 8 shows a perspective view of an alternative wingbone removal device.

FIG. 8 shows how carcasses 230 are conveyed in the direction indicated by arrow 8, with the back of the carcasses facing in the direction of transport. It is also possible for the abdomen of the carcasses to face in the direction of travel. It is possible to use a conveyor 2 (FIG. 1). Beneath the conveyor 2 and parallel to the direction of transport there are two humerus positioning elements 240 which can rotate about their longitudinal axis and are driven, in a manner not shown in more detail, to rotate in opposite directions 242. The humerus positioning elements 240 are provided with flaps 244 which extend in the longitudinal direction and are preferably made from a flexible and/or resilient material, and a gap is defined between the humerus positioning elements 240, substantially having the same width as the body 234 of the carcass. Downstream of the humerus positioning elements 240 there are guides 246, mounted in a frame which is not shown in more detail. In the wingbone removal components 236a shown in FIG. 8, the active assemblies of arms 40, 52 and base plate 26 are positioned next to one another (as seen in the direction of arrow 8) instead of one behind the other, as is the case, for example, in FIG. 6. The basic method of operation is otherwise identical and is as follows.

Figure 7B:
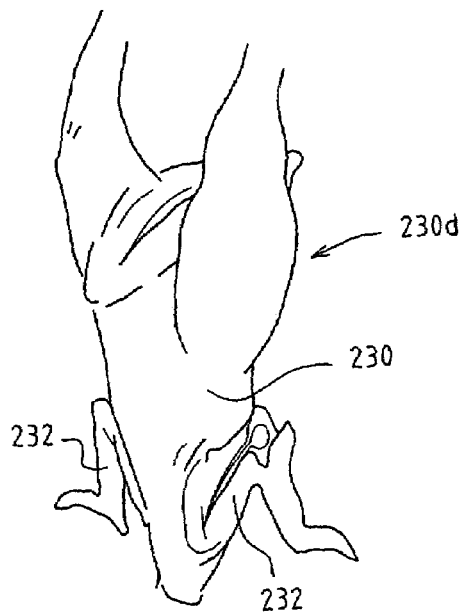
Figure 7C:
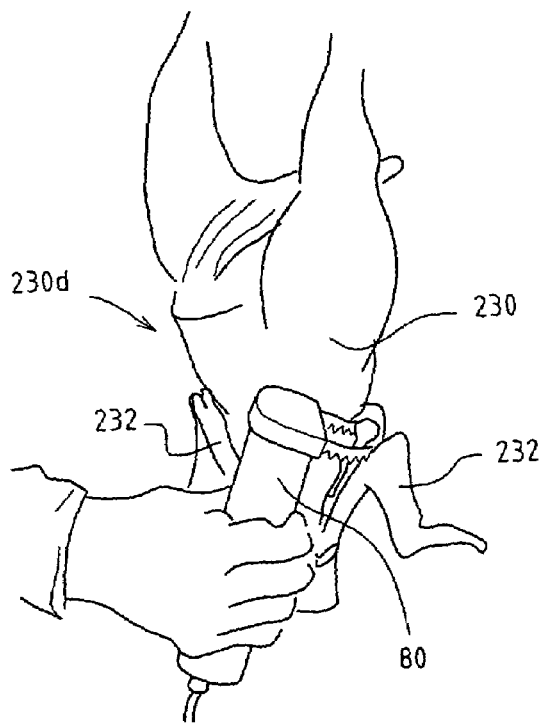

Carcasses 230 are supplied, a preliminary processing operation as shown in FIG. 7b having taken place. Then, the body 234 of each carcass 230 is moved into the gap between the humerus positioning elements 240, the flaps 244 taking the humerus out of the wing 232 on both sides of the body 234. In the process, the humerus moves upwards and may possibly already be partially in the recess 51 and the open scraper opening 46. After it has left the gap, each humerus moves under an associated guide 246, by means of which the humerus is moved fully into the recess 51 and opened scraper opening 46 of the wingbone removal component 236 as conveying of the carcass 230 continues. Then, the humerus is pulled out of the wing in the manner which has already been explained above with reference to FIGS. 6 and 7a.

The knives shown in the devices illustrated in FIGS. 1, 4a, 4b, 4c, 5 and 5a may be designed as described below.

FIGS. 9a, 9b and 9c show a knife 160, in particular a circular knife, with holes 161 and 162 for securing the knife 160 with the aid of screws or the like, for example, to a drive structure (not shown in more detail), such as a spindle and/or a flange, for rotating the knife 160 about a central axis of rotation which is perpendicular to the plane of the knife 160. An annular first region or cutting surface 163 along the circumferential edge of the knife 160 is ground at an angle $\alpha$ of 8–15°, in particular 11°, with respect to the plane of the knife 160, and an annular second region or cutting surface 164 along the circumferential edge of the knife 160 is ground at an angle $\beta$ of 30–40°, in particular 32.5°, with respect to the plane of the knife 160. The grinding pattern is shown at 165. The knife 160, in particular the cutting surfaces 163, 164, is provided with a titanium nitride (TiN) or chromium nitride (CrN) coating. If the entire knife 160 is provided with the coating, the coating only disappears on one side of the knife 160 when the knife 160 is reground after use. The knife 160 is used to make incisions in parts of slaughter animals, in particular to cut off a hip bone of a leg of a slaughter animal or to cut breast pieces, stomachs, thigh skin or neck skin of poultry.

FIGS. 10a, 10b and 10c show a knife 170, in particular a circular knife, with a hole 171 for securing the knife 170 with the aid of screws or the like, for example, to a drive structure (not shown in more detail), such as a spindle and/or a flange, for rotating the knife 170 about a central axis of rotation perpendicular to the plane of the knife 170. An annular first region or cutting surface 172 along the circumferential edge of the knife 170 and on the front side thereof is ground at an angle $\alpha$ of 8 –15°, in particular 10°, with respect to the plane of the knife 170, and an annular second region or cutting surface 173 along the circumferential edge of the knife 170 and on the rear side thereof is ground at an angle $\beta$ of 10–20°, in particular 15°, with respect to the plane of the knife 170. The grinding pattern is indicated at 174. Four elongate radial recesses 175, which in particular have a length which is greater than the width of the area 172, are arranged along the circumferential edge of the knife 170. If necessary, there may be more or fewer recesses 175, distributed evenly or unevenly along the circumference as required, and having an identical or different length or width as required. The knife 170, in particular the cutting surfaces 172, 173, is provided with a titanium nitride (TiN) or chromium nitride (CrN) coating. The knife 170 is used to make incisions in parts of slaughter animals, in particular to cut off a hip bone of a leg of a slaughter animal or to cut thigh skin of poultry.

FIGS. 11a, 11b and 11c show a knife 180, in particular a circular knife, having a hole 181 for securing the knife 180 with the aid of screws or the like, for example, to a drive structure (not shown in more detail), such as a spindle and/or a flange, for rotating the knife 180 about a central axis of rotation perpendicular to the plane of the knife 180. An annular first region or cutting surface 182 along the circumferential edge of the knife 180 and on the front side thereof is ground at an angle α of 8–15°, in particular 10°, with respect to the plane of the knife 180, and an annular second region or cutting surface 183 along the circumferential edge of the knife 180 and the rear side thereof is ground at an angle β of 10–20°, in particular 15°, with respect to the plane of the knife 180. The grinding pattern is indicated at 184. Four elongate, substantially V-shaped radial recesses 185, which in particular have a length which is substantially equal to the width of the area 182, are arranged along the circumferential edge of the knife 180. That end of each recess which faces towards the axis of rotation of the knife 180 is ground at an angle γ of 20–35°, in particular 27°, with respect to the plane of the knife 180. If necessary, there may be more or fewer recesses 185, which may be distributed evenly or unevenly along the circumference as required and may be of identical or different length as required, and may have the same or a different angle between the opposite sides of the recesses as required. The knife 180, in particular the cutting surfaces 182, 183, is provided with a titanium nitride (TiN) or chromium nitride (CrN) coating. The knife 180 is used to make incisions in parts of slaughter animals, in particular to cut off a hip bone of a leg of a slaughter animal or to cut wings or fillets of poultry.

FIGS. 12a, 12b and 12c show a knife 190, in particular a substantially circular knife, having holes 191 and 192 for securing the knife 190 with the aid of screws or the like, for example, to a drive structure (not shown in more detail), such as a spindle and/or a flange, in order to rotate the knife 190 about a central axis of rotation perpendicular to the plane of the knife 190. An annular first region or cutting surface 193 along the circumferential edge of the knife 190 and on the front side thereof is ground at an angle α of 8–15°, in particular 10°, with respect to the plane of the knife 190, and an annular second region or cutting surface 194 along the circumferential edge of the knife 190 and on the rear side thereof is ground at an angle β of 20–35°, in particular 27.5°, with respect to the plane of the knife 190. The grinding pattern is indicated at 195. Twenty-four elongate, substantially U-shaped radial recesses 196, which in particular have a length which is less than the width of the region 193, are arranged along the circumferential edge of the knife 190. That end of each recess which faces towards the axis of rotation of the knife 190 is ground at an angle γ of 20–35°, in particular 27°, with respect to the plane of the knife 190. If necessary, there may be more or fewer recesses 196, distributed evenly or unevenly along the circumference as required, and having an identical or different length as required. The knife 190, in particular the cutting surfaces 193, 194, is provided with a titanium nitride (TiN) or chromium nitride (CrN) coating. The knife 190 is used to make incisions in parts of slaughter animals, in particular for cutting off a hip bone of a leg of a slaughter animal or for cutting stomachs or legs of poultry.

The invention has been illustrated above with reference to legs for removal of the thighbone therefrom and with reference to wings for removal of the humerus therefrom. It is not necessary for the extremities to be separated from the body of the slaughter animal in question prior to the bone removal: if the body joint is dislocated prior to the bone removal and surrounding tissue connections have been at least partially broken, the bone removal may also take place while the extremity is still connected to the body of the slaughter animal.

The invention claimed is:

1. A method for removing an elongate bone from an extremity or part thereof of a slaughter animal by an assembly configured for removing the elongate bone, the elongate bone having a longitudinal axis and first and second joint ends, the extremity or part thereof comprising meat and the method comprising:
   a. removing the first joint end of the bone from the extremity with a bone removal device, wherein a tissue connection between the extremity and the second joint end of the bone is substantially retained;
   b. moving at least one of the bone and the meat away from the other in the region of the second joint end with a moving device; and
   c. breaking the tissue connection between the extremity and the second joint end of the bone with a separating device.

2. The method of claim 1, wherein moving at least one of the bone and the meat away from the other comprises moving the bone relative to a scraper device in a direction substantially parallel to the longitudinal axis of the bone so that the scraper device scrapes the bone from a position between the first and the second joint ends and moves relative to the bone in the direction of the second joint end.

3. The method of claim 2, wherein the scraper device moves relative to the bone to a location beyond the second joint end of the bone.

4. The method of claim 2, wherein breaking the tissue connection between the extremity and the bone comprises cuffing the at least one tissue connection proximal the scraper device.

5. The method of claim 1, wherein the slaughter animal, when intact, comprises a body and a body joint between the bone and the body, wherein the body joint comprises the second joint end.

6. The method of claim 1, wherein breaking tissue connection between the extremity and the bone comprises ripping the at least tissue connection.

7. The method of claim 1, wherein the first joint end forms a first joint with at least a first joint end of a second bone, the method further comprising the step of moving the first joint end of the bone away from the first joint end of the second bone with the bone removal device.

8. The method of claim 7, wherein the slaughter animal, when intact, comprises a body and a body joint between the bone and the body, wherein the body joint comprises the first joint end.

9. An assembly for removing an elongate bone, having a longitudinal axis and first and second joint ends, from an extremity or part thereof of a slaughter animal, the extremity or part thereof comprising meat and the assembly comprising:
   a. a bone removal device for removing the first joint end of the bone from the extremity, a tissue connection between the extremity and the second joint end of the bone being substantially retained;
   b. a moving device for moving at least one of the bone and the meat away from the other in the region of the second joint end; and c. a separating device for breaking the tissue connection between the extremity and the second joint end of the bone.

10. The assembly of claim 9, wherein the moving device comprises a scraper device adapted to engage the bone and scrape along the bone toward the second joint end of the bone.

11. The assembly of claim 10, wherein the moving device further comprises an arm adapted to engage the bone in the vicinity of the first joint end and to displace the bone relative to the scraper device engaging the bone.

12. The assembly of claim 10, wherein the separating device comprises a blade positioned adjacent the scraper device.

13. The assembly of claim 9, wherein the slaughter animal, when intact, comprises a body and a body joint between the bone and the body, wherein the body joint comprises the second joint end.

14. The assembly of claim 13, wherein the moving device comprises a scraper device adapted to engage the bone and scrape along the bone toward the second joint end of the bone.

15. The assembly of claim 14, wherein the moving device further comprises an arm adapted to engage the bone in the vicinity of the first joint end and to displace the bone relative to the scraper device engaging the bone.

16. The assembly of claim 9, wherein the moving device comprises two parallel rolls.

17. The assembly of claim 16, wherein the distance between the rolls is smaller than the transverse dimensions of the bone.

18. The assembly of claim 16, wherein an outer surface of at least one roll comprises projections.

19. The assembly of claim 18, wherein the projections comprise ribs.

20. The assembly of claim 9, wherein the moving device comprises a roll and a guide which is parallel to the roll.

21. The assembly of claim 20, wherein the distance between the roll and the guide is smaller than the transverse dimensions of the bone.

22. The assembly of claim 9, wherein the bone removal device comprises a knife.

23. The assembly of claim 9, wherein the bone removal device comprises two parallel rolls.

24. The assembly of claim 23, wherein the rolls comprise projections.

25. The assembly of claim 24, wherein the projections comprise flaps.

26. The assembly of claim 9, wherein the first joint end forms a first joint with at least a first joint end of a second bone, and the bone removal device moves the first joint end of the bone away from the first joint end of the second bone.

27. The assembly of claim 26, wherein the slaughter animal, when intact, comprises a body and a body joint between the bone and the body, wherein the body joint comprises the first joint end.

* * * * *